(12) United States Patent
Fava

(10) Patent No.: US 9,944,462 B2
(45) Date of Patent: Apr. 17, 2018

(54) HANDLING APPARATUS

(71) Applicant: FAVA S.N.C. DI ADELE TURETTA & C., Parma (IT)

(72) Inventor: Antonio Fava, Parma (IT)

(73) Assignee: FAVA S.N.C. DI ADELE TURETTA & C., Parma (IT)

( * ) Notice: Subject to any disclaimer, the term of this patent is extended or adjusted under 35 U.S.C. 154(b) by 436 days.

(21) Appl. No.: 14/434,121

(22) PCT Filed: Oct. 8, 2013

(86) PCT No.: PCT/IB2013/002244
§ 371 (c)(1),
(2) Date: Apr. 8, 2015

(87) PCT Pub. No.: WO2014/057337
PCT Pub. Date: Apr. 17, 2014

(65) Prior Publication Data
US 2015/0266671 A1    Sep. 24, 2015

(30) Foreign Application Priority Data
Oct. 9, 2012   (IT) .............. RE2012A0065

(51) Int. Cl.
*B65G 1/04*   (2006.01)
*B25J 9/02*   (2006.01)
*B65G 65/08*   (2006.01)

(52) U.S. Cl.
CPC ............ *B65G 1/0407* (2013.01); *B25J 9/026* (2013.01); *B65G 1/0457* (2013.01); *B65G 65/08* (2013.01); *B65G 2201/0202* (2013.01)

(58) Field of Classification Search
CPC .......................... B65G 1/0457; B65G 1/0407
See application file for complete search history.

(56) References Cited

U.S. PATENT DOCUMENTS 4,787,804 A * 11/1988 Edenas .................. B66F 9/07
414/254
2005/0095094 A1    5/2005  Maynard et al.
(Continued)

FOREIGN PATENT DOCUMENTS

WO        0018548 A1   6/2000
WO     2005009691 A1   2/2005

*Primary Examiner* — Jonathan Snelting
(74) *Attorney, Agent, or Firm* — Browdy and Neimark, P.L.L.C.

(57) ABSTRACT

A handling apparatus, for transferring an object at a time between two loading/unloading stations, each station having a support shelf on which opposite ends of the objects rest. The handling device includes a support structure, a motorized mobile carriage vertically movable with respect to the support structure, support arms, elongate, straight, horizontal and parallel to one another, borne by the carriage to restingly support the opposite ends of the objects, a device for producing outward extraction of the support arms with respect to the carriage such as to produce penetration thereof internally of the loading/unloading stations, and retraction of the arms internally of the carriage, in a longitudinal direction parallel to the support shelves, the mobile carriage further bearing second support arms, elongate, straight, horizontal and having support edges able to restingly support the two opposite ends of the objects; the second arms being vertically mobile with respect to the first support arms in such a way as to transfer support of the objects from the first arms to the second arms and vice versa.

8 Claims, 13 Drawing Sheets

(56) References Cited

U.S. PATENT DOCUMENTS

| | | | |
|---|---|---|---|
| 2007/0140821 A1 | 6/2007 | Garon et al. | |
| 2007/0144991 A1* | 6/2007 | Hansl | B65G 1/0407 |
| | | | 211/121 |
| 2011/0033270 A1* | 2/2011 | Toncelli | B65G 1/0407 |
| | | | 414/277 |

* cited by examiner

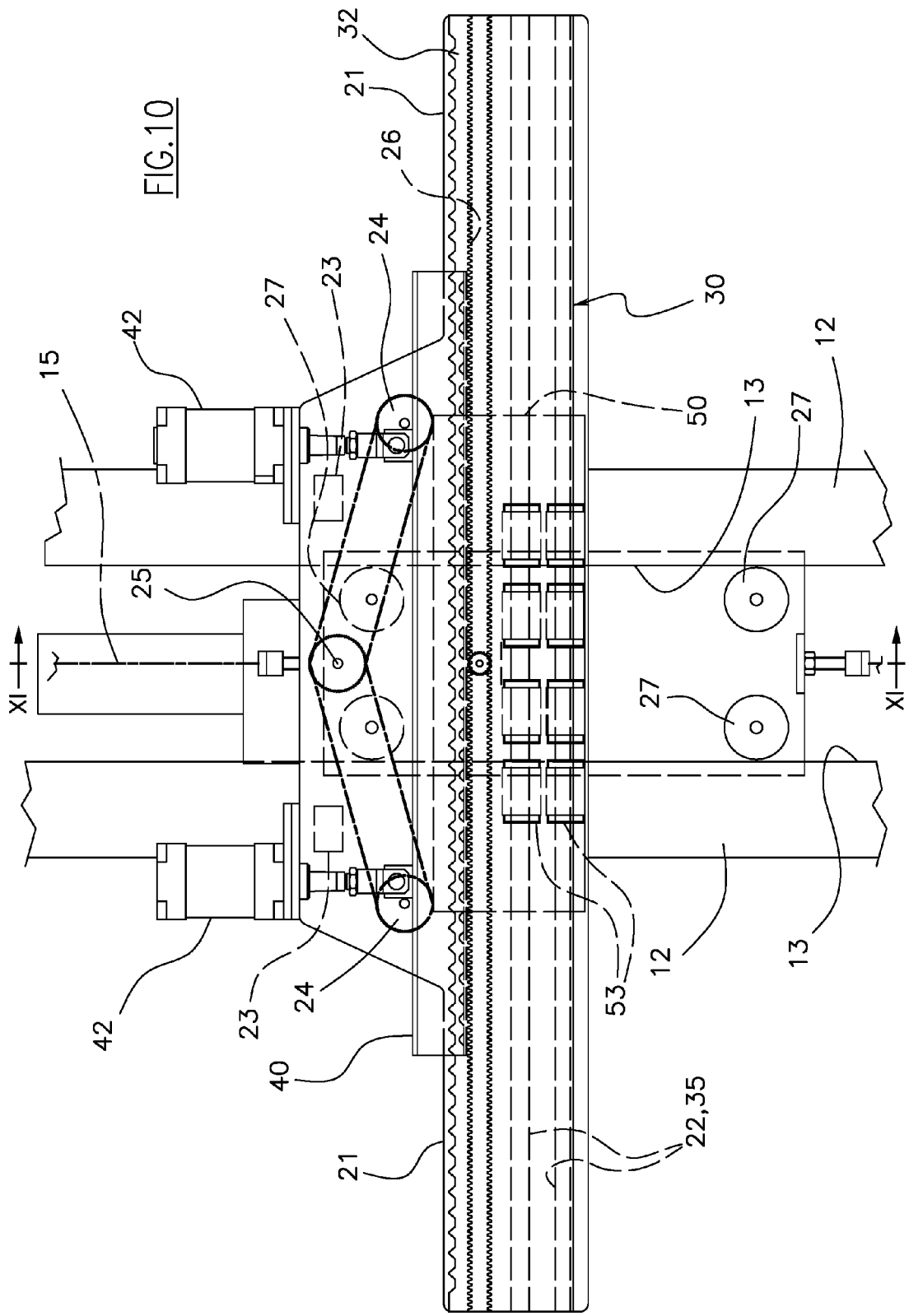

HANDLING APPARATUS

TECHNICAL FIELD

The present invention relates to a handling device and a relative operating method for transferring objects between two loading/unloading stations, i.e. collecting the objects from an unloading station and freely arranging them in a loading station, where the stations each have at least a support surface defined by two opposite projecting support brackets, and the objects have two opposite ends by means of which they rest on the support surface.

BACKGROUND ART

Typically, the loading/unloading station is a structure which has a plurality of storage shelves, superposed on one another, each defined by a pair of opposite brackets fixed to two respective vertical internal faces (open or closed). The objects are arranged on shelves where they rest on the brackets only by opposite ends of the objects themselves. Usually the brackets comprise horizontal beams a longitudinal extension whereof is in a horizontal plane and interests almost the whole horizontal depth of the storage space; the extension in the transversal direction is somewhat limited, in order to leave the central area of each shelf substantially free.

DISCLOSURES OF THE INVENTION

By way of example, FIG. 4 illustrates a storage structure of the above-described type: it is a shelving system that includes a storage space P1, delimited by opposite vertical and lateral walls P2 (closed or more or less open), on internal faces of which projecting support brackets P3 are positioned in the form of opposite horizontal beams extending over the full depth of the space P1; the brackets P3 are directed transversally towards one another so as to supportingly receive objects R.

In the illustrated example, the objects R are each defined by a support bar R1 (usually an aluminium or steel rod) on which several products (e.g. sacked meats) R2 are hung, each by means of a lace R3.

Each pair of opposite brackets P3 defines a support surface P4 for supporting the objects R. The support bar R1 rests with free ends thereof on the two opposite brackets P3; various objects R can be arranged resting on a same support shelf P4 (i.e. on the same pair of opposing brackets P3).

A typical application of the invention is in the production process of sacked meats. The loading/unloading station illustrated in FIG. 4, is an example of shelving used in such processes, where the meat products are subjected to aging, smoking, or other steps.

Obviously the invention can be used for other and different processes.

Furthermore, the loading/unloading station might not be a storage structure such as the one illustrated in FIG. 4. In particular the station can have only one support shelf. An example of application is a case in which the loading/unloading station comprises two longitudinal elements parallel to one another on which objects R are restingly placed.

The handling machine according to the invention is arranged between at least two loading/unloading stations, opposite or flanked, not necessarily symmetrical.

A particular application is to transfer objects between two stations, both being storage structures, which can have the same number of shelves and the same load capacity, or have different numbers of shelves (as in the case illustrated in the attached figures) and/or shelves with different capacities.

The known plants for the above-described applications, and in particular the production of sacked meats, involve the use of pluri-axis robots that move a C-shaped tool with which they raise one or more bars on which the sacked meats are hung, positioned in an unloading station, and, with the use of rotational movements with respect to the vertical axis, arrange them in a loading station.

Also known is a second type of handling apparatus suitable for the above-delineated use, and in particular for seasoning, smoking or others besides, of sacked-meat products, which use a vertically-mobile carriage which bears two support arms of the bars, parallel and mobile solidly with one another, which are moved vertically by the carriage and which are able to penetrate and retract in a horizontal direction from the loading/unloading station in order to receive therefrom or replace therein a series of bars at a time; the displacement of the products from one end to another of the arms is obtained by means of two transmissions with chains supporting the products.

These apparatus, while working well, exhibit however a horizontally-directed dimension that is relatively large for reasons that are intrinsic to the structure and the movement of the pair of support arms; in particular these devices limit the quantity of product that can be managed in a frame, and therefore do not enable a better exploitation of the spaces and seasonings.

An object of the present invention is to improve the second type of apparatus so that it presents:

a large reduction of the plan dimensions (at least 30% less than the most compact known solution);

the absence of any particular limitation of the longitudinal and transversal extensions, thanks to both the conceptual setup and the constructional realisation of the telescopic movements;

better exploitation of the spaces, with structural and plant-centred advantages for the production facility;

a high productive capacity due to the simplicity of the movements;

an especially simple constructively economic structure.

This and other aims are attained by the invention as characterized in the claims.

BRIEF DESCRIPTION OF THE DRAWINGS

The invention is described in detail in the following with the aid of the accompanying figures, which illustrate some embodiments thereof by way of non-exclusive example.

FIG. 10 is the same view as FIG. 5 of an enlarged detail of a second embodiment of the mobile carriage.

BEST WAY TO CARRYING OUT THE INVENTION

The handling apparatus serves to transfer objects between an unloading station (PS) and a loading station (PC), each of the stations having at least a support shelf defined by two opposite projecting support brackets, where the objects R exhibit two opposite ends by means of which they rest on the support surface.

Figure 1:
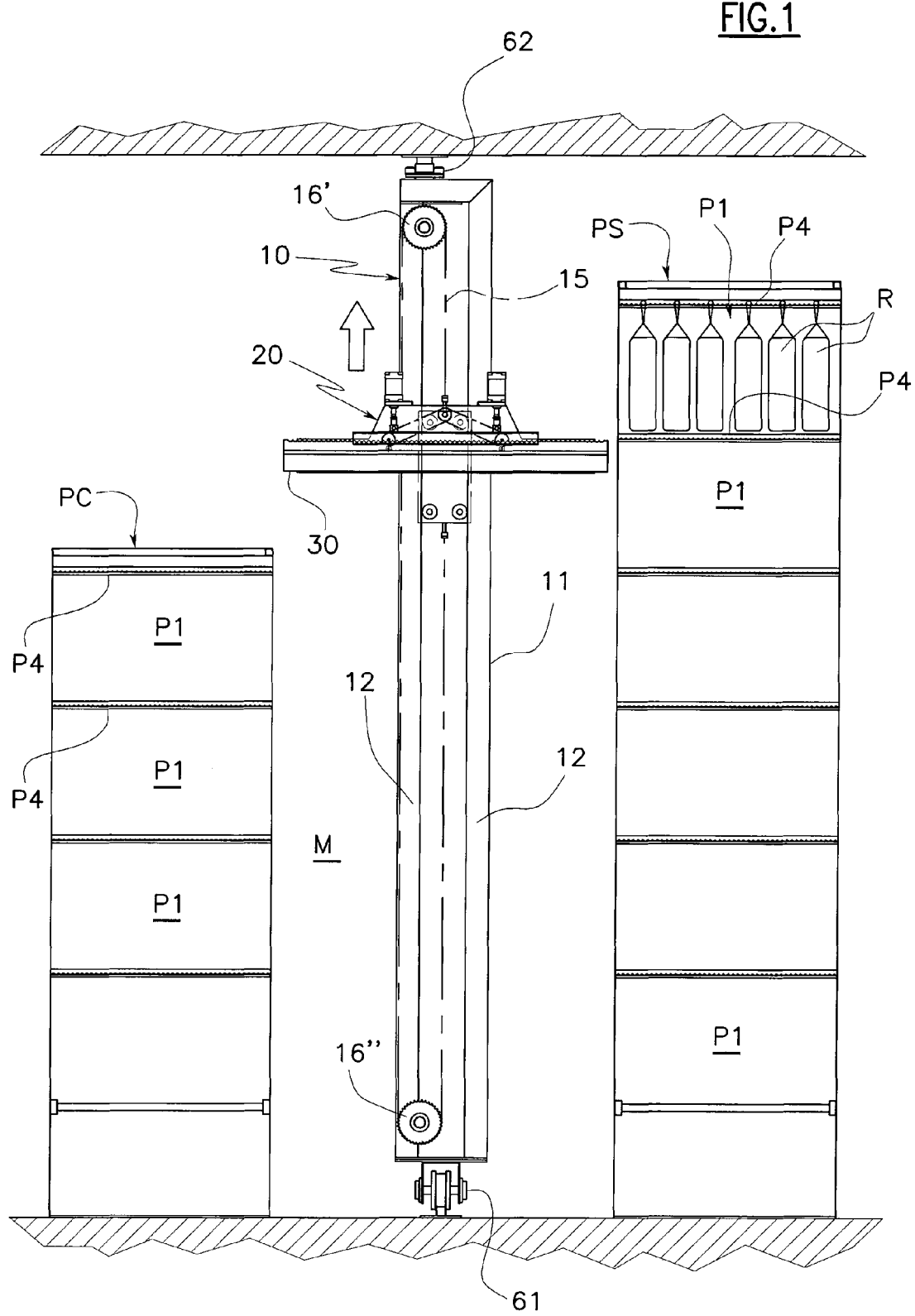
FIG. 1 is a simplified view, in vertical elevation, of an embodiment of the handling apparatus interposed between a loading station and an unloading station.
Figure 4:
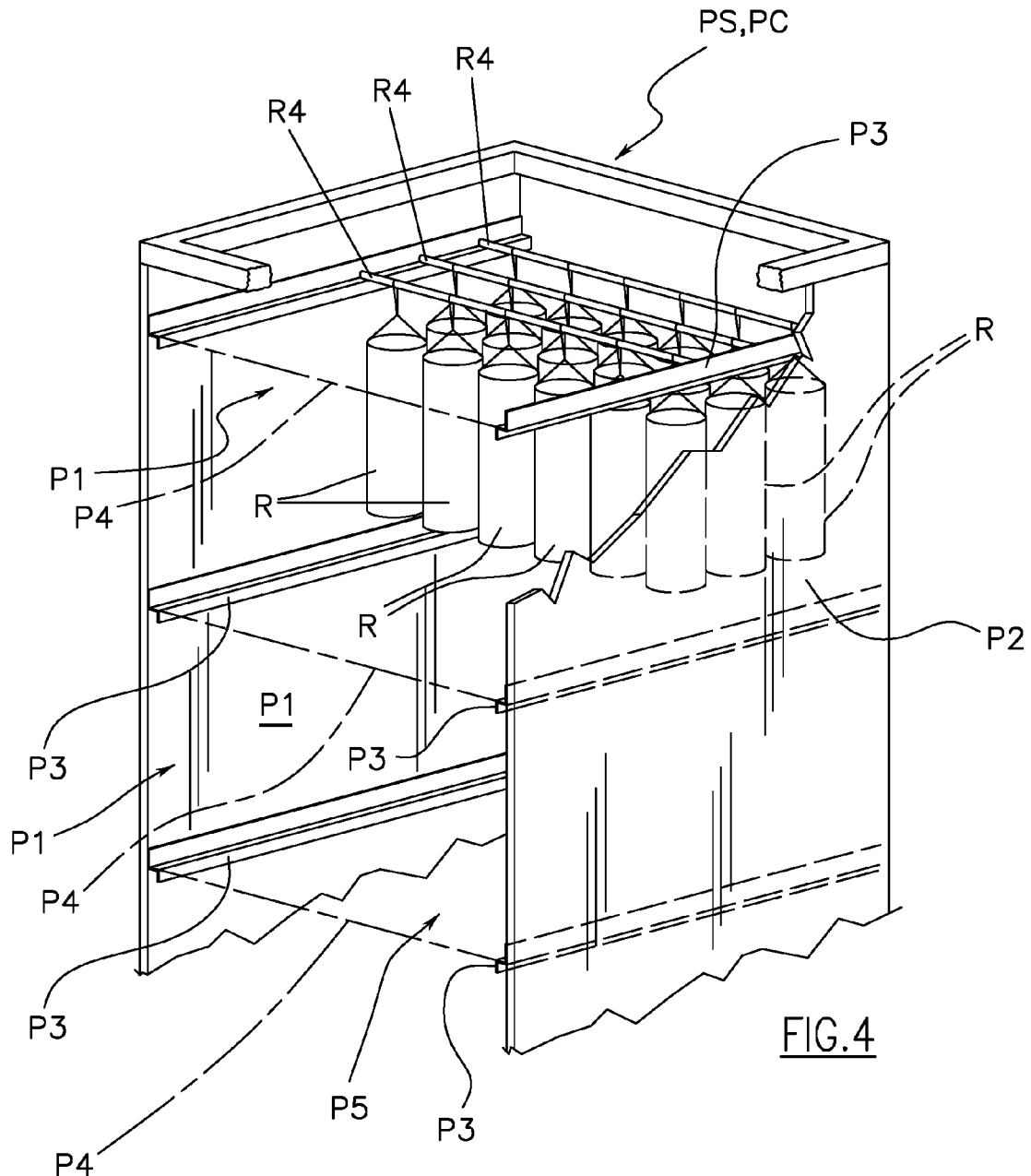
FIG. 4 shows the upper part of the loading/unloading station on the right of FIG. 1 in perspective view and in a simplified form.

In the embodiment illustrated in FIG. 1 and FIG. 4, each of the stations PS and PC is defined by a shelving which comprises a storage area P1, delimited by opposite vertical and lateral walls P2, on internal faces of which projecting support brackets P3 are positioned, effectively being opposite horizontal beams that extend over the full depth (longitudinal dimension) of the space P1; the brackets P3 are directed transversally towards one another so as to receive and support objects R. In the illustrated example, the objects R are each defined by a support bar R1 on which several products R2 (e.g. sacked meats) are hung, each by means of a lace R3. Each pair of opposite brackets P3 defines a support shelf P4 for supporting the objects R. The support bar R1 rests with the free ends R4 thereof on the two brackets P3; various objects R may be arranged resting on a same support shelf P4 (i.e. on a pair of opposite brackets P3). At least an open face P5 is provided for the entry/exit passage of the objects R.

The handling apparatus, denoted by 10, comprises a main support structure 11 having a vertical development, and a motorised mobile carriage 20 constrained to the main structure 11 with the ability to translate in a vertical direction.

Figure 2:
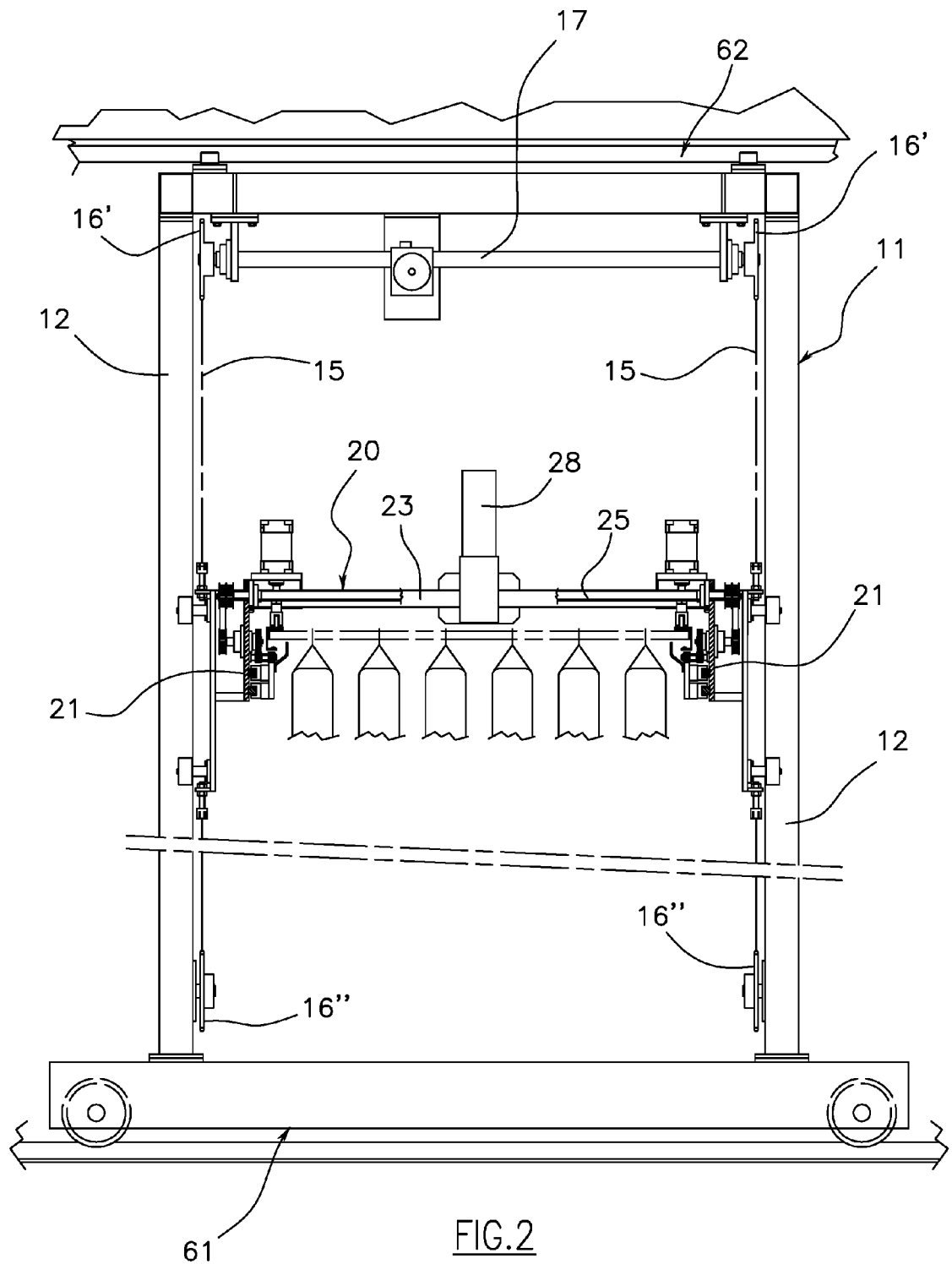
FIG. 2 is a simplified view of the handling apparatus, according to arrow II of FIG. 1.
Figure 3:
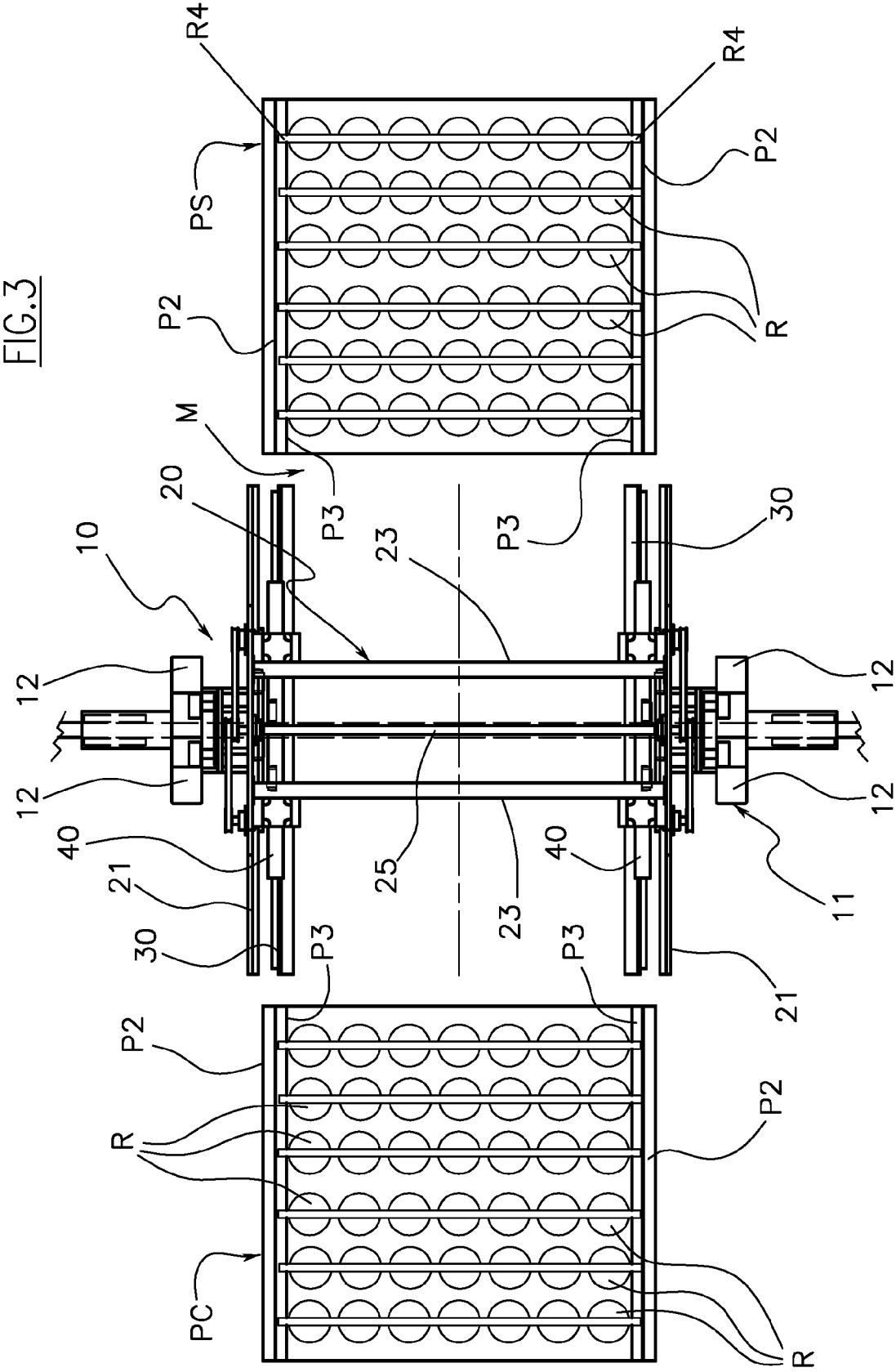
FIG. 3 is a simplified plan view from above of FIG. 1.

In greater detail, the structure 11 is parallelepiped, or has an open structure, is mainly vertically-developing and exhibits four columns 12 along the vertical corners. The distance between two opposite columns 12 arranged in the same longitudinal vertical plane (see FIG. 1) is less than the distance between two columns 12 arranged in the same transversal vertical plane (see FIG. 2).

The carriage 20 bears a pair of rigid first supporting arms 30, elongate, straight, constrained to the carriage in such a way as to be constantly horizontally arranged and parallel to one another, which are borne and moved by the carriage in the vertical direction. The arms 30 have upper support edges 32 the surface of which is facing upwards, able to restingly support the two opposite ends R4 of the objects. The two upper support edges 32 are parallel to one another and placed at a slightly smaller distance than the distance between two brackets P3 of the same support shelf P4.

The support arms 30 are telescopically constrained to the carriage 20, with the possibility of extension and retraction with respect to the carriage 20 along the longitudinal and horizontal axis thereof.

Figure 5:
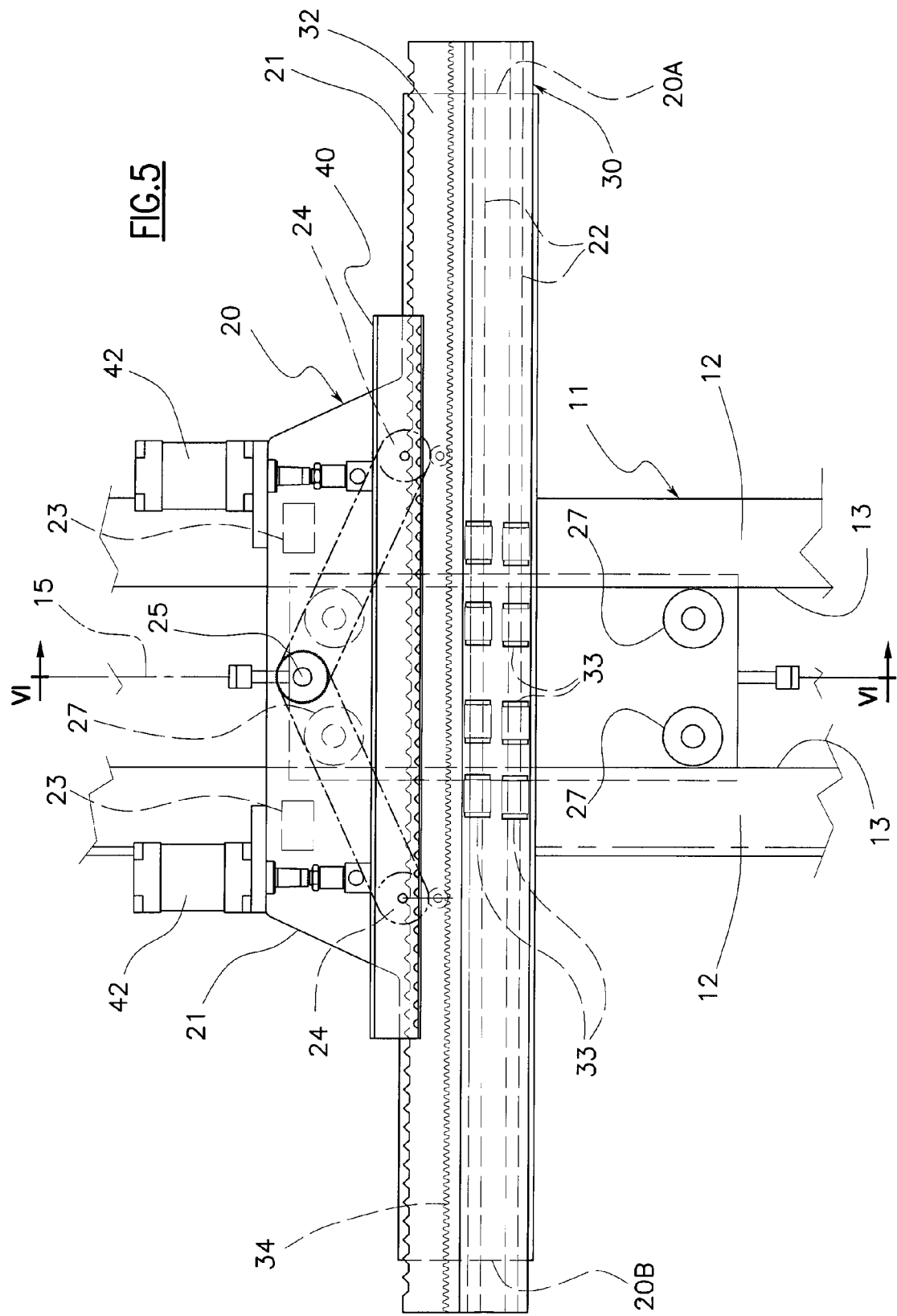
FIG. 5 is an enlarged detail of FIG. 1 which relates to the mobile carriage of the handling apparatus.
Figure 6:
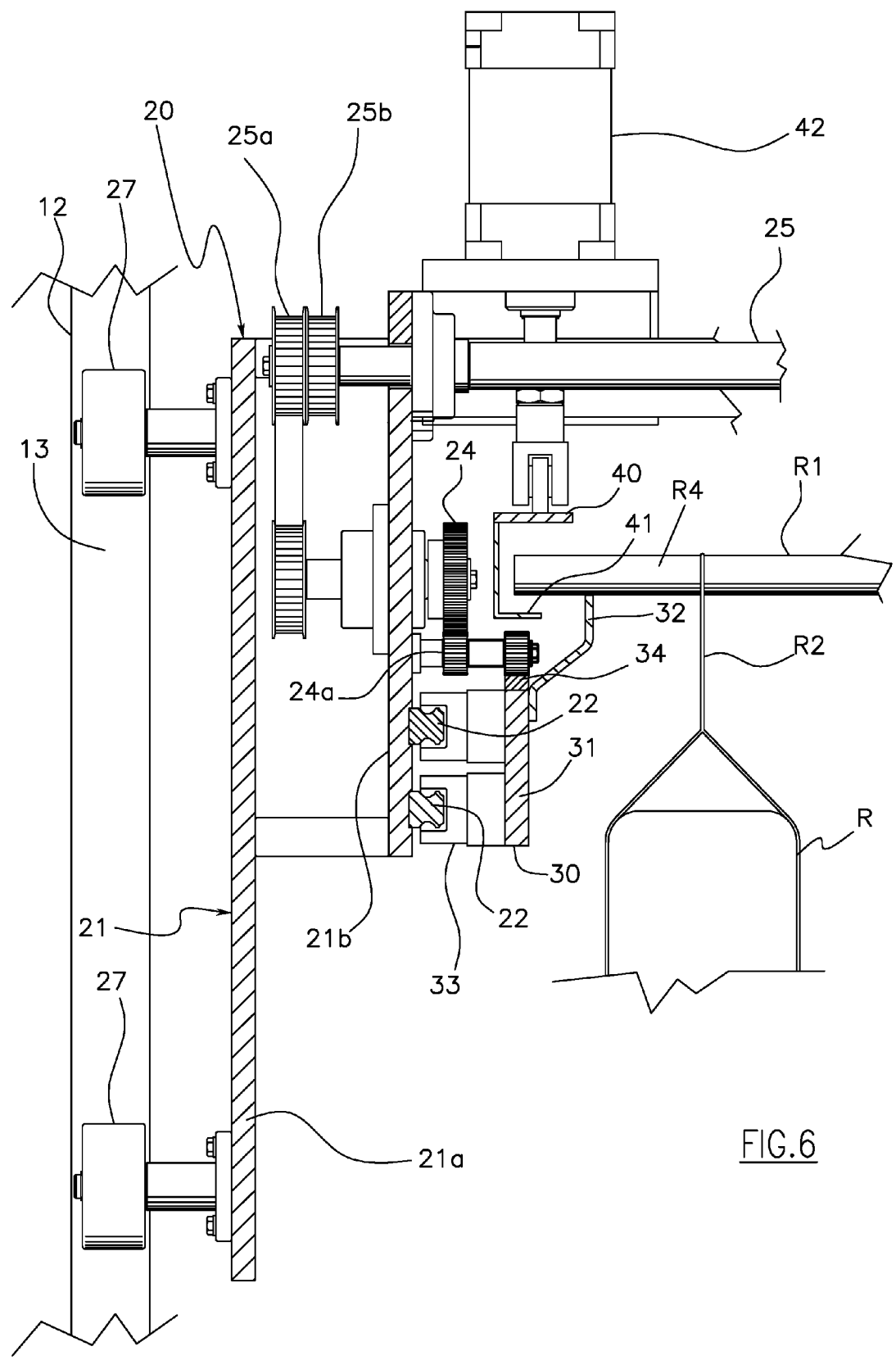
FIG. 6 is a section along plane VI-VI of FIG. 5.

According to the embodiment shown in FIGS. 5 and 6, the carriage 20 comprises two plate-shaped longitudinal sides 21 parallel to the vertical longitudinal plane (see FIG. 1), opposite and distanced from one another, having longitudinal sliding means, by means of which the support arms 30 are associated to the respective sides, slidably with respect thereto in the longitudinal direction and horizontally along the axis thereof, with extension and retraction capability relative to the carriage. The two sides 21 are rigidly interconnected by two horizontal cross members 23. In the embodiment shown in FIG. 6, the internal face of each side 21 is provided with pairs of longitudinal guides 22 which engage in female guide elements 33 fixed to the first arm 30 and having a horizontal and longitudinal development: the guides 22 and the guide elements 33 define a constraint between the arms 30 and the sides 21, which allow the arms 30 to slide only in the longitudinal direction and horizontally along the longitudinal axis thereof, with extraction and retraction with respect to the carriage 20.

To produce the translational motion of the mobile carriage 20 in a vertical direction, lifting means are provided. In the embodiment shown in the figures, these means comprise, for each side 21, a drive chain 15 loop-wound about two cogged wheels positioned one (16') at the upper end of the main structure 11 and the other (16") at the lower end. The pair of upper wheels 16' is powered by a gear reducer 17 and one of the vertical branches of each chain is fixed to the respective side 21.

The action of the gear reducer 17 produces the translational motion simultaneously in the vertical direction of the two sides 21. Further, the sides 21 are coupled to the main structure 1 by means of idle rollers 27 which slidingly engage along vertical guides 13 applied to the columns 12, creating a constraint that allows the carriage 20 only translational motion in the vertical direction.

Further production means of the externalwards extension of the support arms 30 with respect to the carriage are located on the carriage 20, so as to produce the penetration of the arms 30 into the loading/unloading stations PS, PC, and the retraction of the arms 30 internally of the carriage 20, with the longitudinal direction parallel to the support shelves P4.

According to the embodiment shown in FIGS. 5 and 6, each side 21 comprises two neighbouring plates 21a and 21b, parallel to the vertical longitudinal plane (see FIG. 1), parallel and solidly constrained to one another: the more external plate 21a bears the rollers 27 and is directly constrained to the other plate 21a by means of the cross members 23, while the more internal plate 21b bears moving means of the arms 30.

The movement means comprise, for each side 21, a pair of gearwheels 24, pivoted on a horizontal axis to the internal plate 21b.

The four gearwheels 24 of the carriage 20 are driven in rotation by a single drive shaft 25, supported by the carriage 20 and powered by a gear reducer 28, which by means of driving pulleys 25a and driven pulleys 25b sets all the wheels 24 in rotation, simultaneously and in a same direction. At each side 21 thereof, the wheels 24 engage directly or indirectly (via a pair of relay gearwheels 24a, as in the case shown in FIG. 6) on a rack 34, horizontal and longitudinal and fixed to the first arm 30, which runs substantially along the entire arm 30.

In particular, as shown in FIG. 6, the support arm 30 comprises a flat plate 31, rectangular in plan view, with a longitudinal horizontal development that is much greater than a height thereof, to the inner surface of which a profiled element is fixed, which interests the entire length of the plate 31 and defines a support edge 32, having a horizontal and longitudinal profile for supporting objects R.

The arms 30 are arranged in a geometrical relationship with the loading PC and unloading PS stations, such that, when they are extracted externally of the carriage 20, and penetrate into the loading/unloading PC/PS stations, the arms 30 penetrate along the two end zones of the objects, below and relatively close to the brackets P3, and the upper support edges 32 project towards the median line of the carriage 20, a little beyond the free end of the brackets P3 (see FIG. 8); the section of the arms 30 is relatively small so that the arms, and the relative upper support edges 32, are able to slide axially into the stations PS/PC without encountering obstacles, neither in connection with the objects R nor with structural elements of the stations PS/PC.

Each plate 31 has a straight and horizontal upper edge on which the rack 34 is fixed. The same-direction rotation imparted by the shaft 25 to wheels 24 produces, via the racks 34, the sliding in the longitudinal axial direction of the support arms 30, in one direction or in the opposite direction, and thus the extraction and retraction of the arms with respect to the sides of the carriage 20.

The carriage 20 has two opposite transversal end sides 20A and 20B, left and right according to FIG. 5, and the support arms 30 are extractable and retractable with respect to both opposite sides 20A and 20B of the carriage.

When the arms 30 are extracted, i.e. are displaced in relation to the carriage, they penetrate into the loading/unloading stations PC/PS, and when (after a suitable vertical displacement of the carriage upwards or downwards according to the function to be carried out) they are retracted inside the carriage 20 or in any case into the central configuration in relation to the carriage, they are external of the stations PC/PS.

Figure 6A:
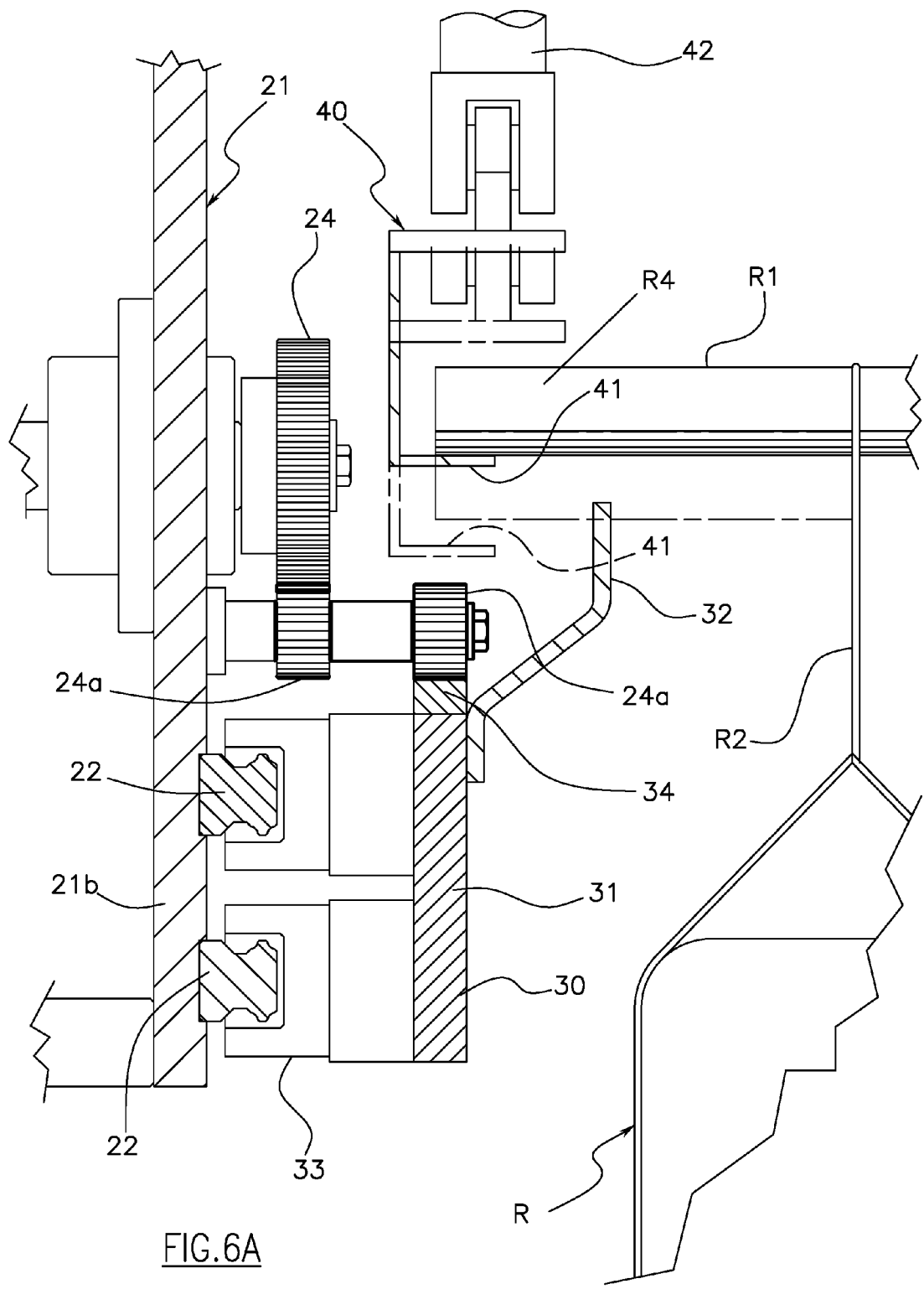
FIG. 6A is an enlarged detail of FIG. 6.

The mobile carriage 20 comprises a pair of second support arms 40, elongate, straight, horizontal and parallel to one another, integral with the carriage 20 itself, having upper support edges 41 able to restingly support the objects R on the two opposite ends R4. The second arms 40 are arranged parallel and in spatial relationship with the first supporting arms 30 and are mobile vertically with respect thereto, so that the vertical displacement of the second arms 40 with respect to the first arms 30 realises the transfer of the support of the objects R from the first arms 30 to the second arms 40 and vice versa. For this purpose, lifting means are provided, for example, pneumatic jacks 42, borne by the mobile carriage 20, which support and move the second arms 40 vertically in translation between a lowered position (shown by the solid line in FIG. 6 and by the broken line in FIG. 6A), in which the support edge 41 thereof is placed at a slightly lower level than the level of the support edge 32 of the first arms, and a raised position (illustrated by an unbroken line in FIG. 6A), in which the support edge 41 thereof is placed at a level slightly above the level of the support edge 32 of the first arms.

In the embodiment shown in FIGS. 5 and 6, the second arms 40 are located at each side 21 of the carriage 20, and have an elongate profile in a longitudinal horizontal direction (parallel to the first arms 30). The transversal section of the profile forms a hook having a concavity that surrounds the end R4 of the object and the lower element of which defines the support edge 41. The arm 40 is placed in proximity of the first arm 30, without however coming into contact with it, and is supported directly by the jacks 42. The length thereof is generally a little smaller than the length of the first arms 30.

In operation, the handling apparatus 10 is interposed between an unloading station PS and a loading station PC, where the two stations are, in a preferred (but not exclusive) embodiment, opposite and in a mirrored symmetry, with the open faces P5 thereof directed towards one another. The two stations PS and PC are at a reciprocal distance such as to define an intermediate vertical corridor M onto which the open faces P5 face.

The handling device 10 is contained in the corridor M and can move the carriage 20 in the vertical direction along with the other members borne thereby; the corridor also enables translation of the apparatus in its entirety so as to be able to manage a plurality of stations.

Figure 7:
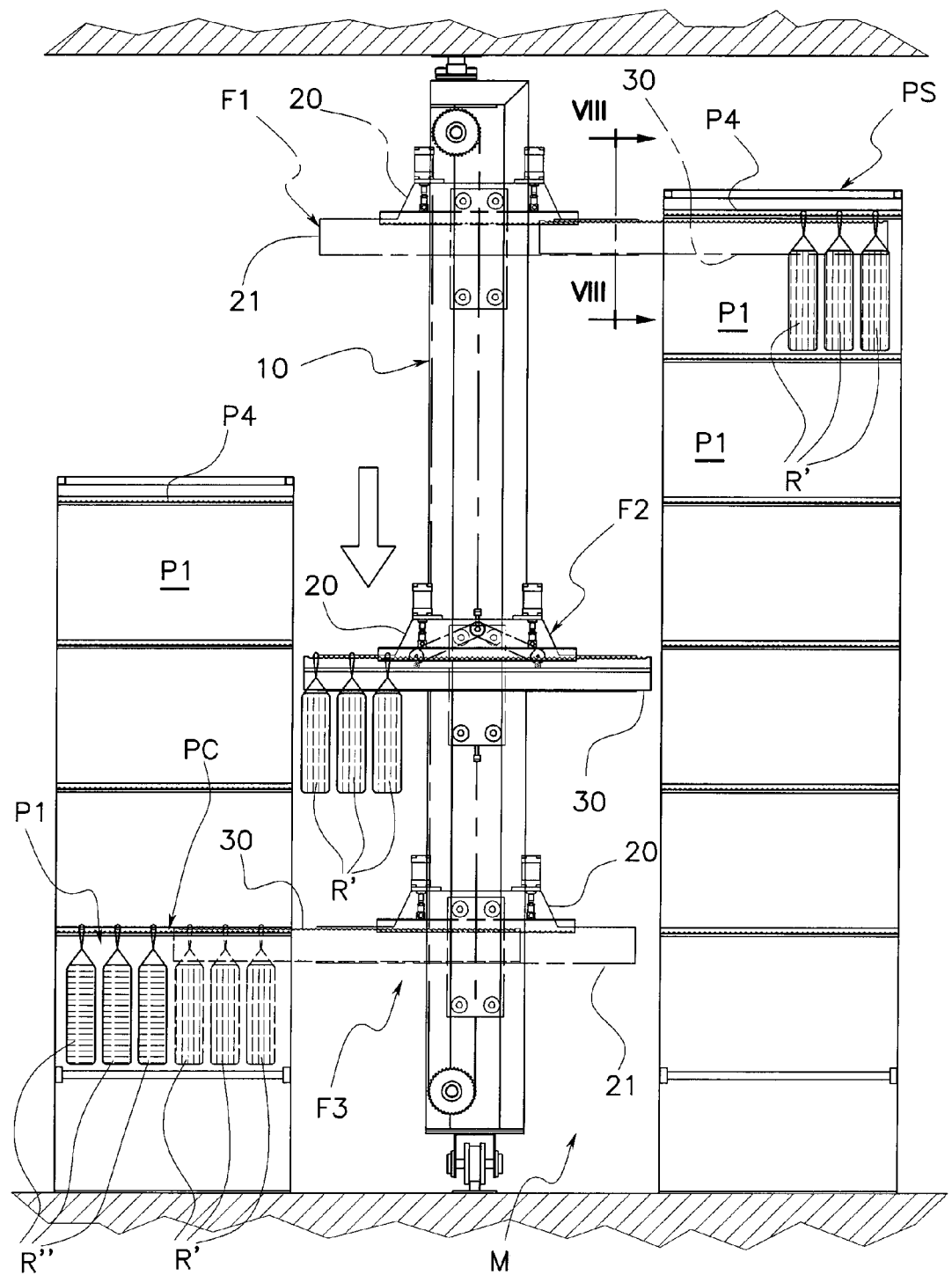
FIG. 7 is a schematic view of FIG. 1, showing a sequence of different positions of the handling apparatus.

In the case illustrated in FIG. 7, the transfer of the objects takes place between two stations PS and PC, each consisting of a rack of shelving having a plurality of shelves stacked between them. The figure schematically illustrates some positions, indicated by F1, F2 and F3, in which the mobile carriage 20 and the bodies borne thereby is positioned when transferring a group of objects R' (in the example each of them is constituted by a support bar on which sacked meats are hung) located on a support shelf P4 of an unloading station PS to a support shelf P4 of a loading station PC. In particular, as an example, FIG. 7 shows the transfer of a group of objects R' (marked in vertical broken lines) from the support shelf P4 higher than a shelving located on the right that defines the unloading station PS, to the lower support shelf P4 of a shelving located on the left which defines the loading station PC; in the illustrated case three objects R' at a time are transferred, taken from a shelf P4 capable of containing a larger amount (twice as much in the figure). Obviously different numbers of objects R can be transferred at a time, including all the objects placed on an entire shelf P4, or, inversely, one object R at a time.

In the situation illustrated in FIG. 7, the unloading station PS (upper right), contains only the group of objects R', placed in position relatively far from the corridor M, which are transferred to the loading station PC; this station contains a group of three objects R" (marked by a broken line in horizontal broken lines), transferred therein at an earlier stage to that illustrated in FIG. 7 (in particular from the station PS), arranged in a position relatively far from the corridor M; in this station PC the zone close to the corridor M is free and the objects R' coming from the station PS are transferred into it.

The transfer cycle comprises an unloading step and a loading step with respect to the stations PS and PC.

Figure 8:
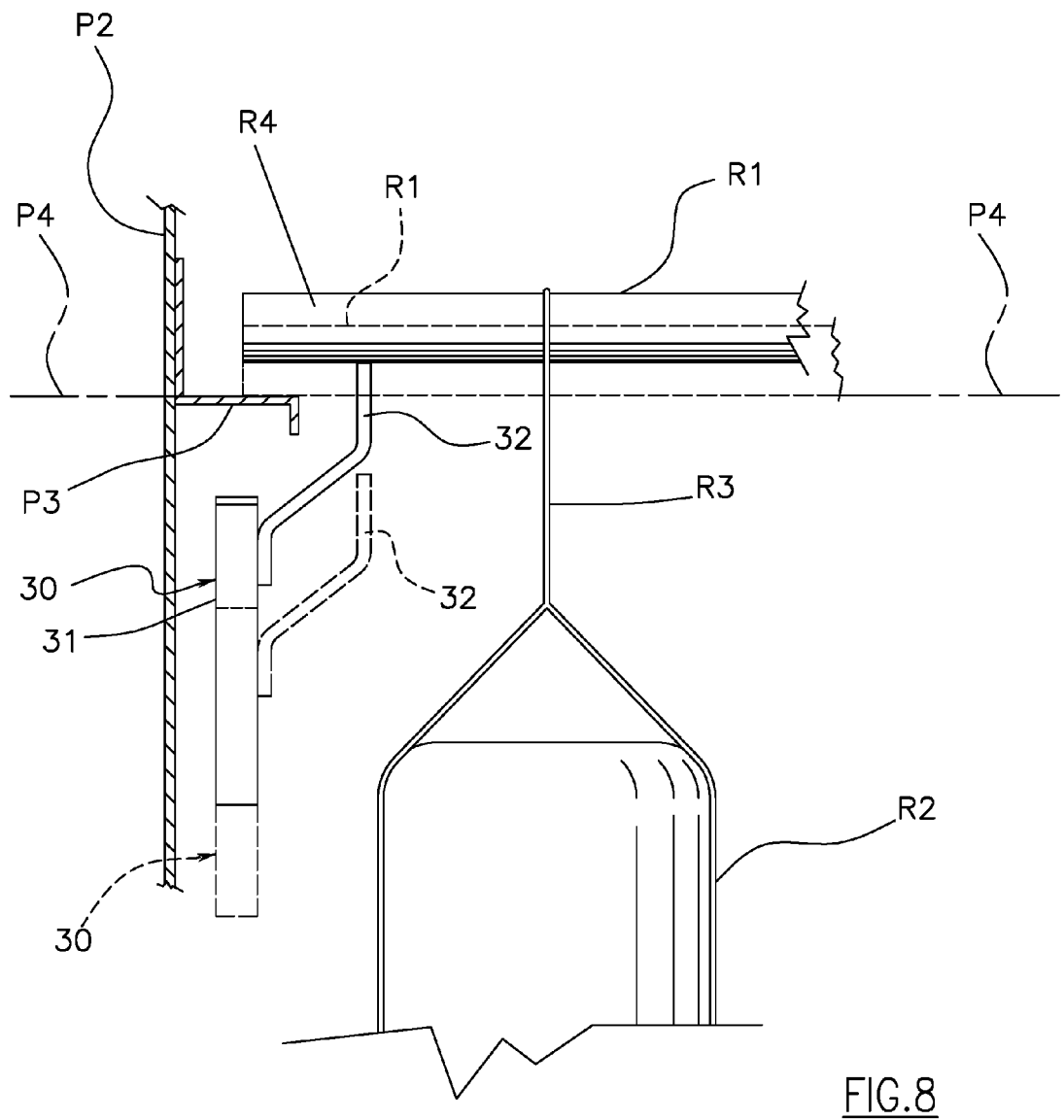
FIG. 8 is a section along plane VIII-VIII of FIG. 7.

During unloading:

first the mobile carriage 20 is moved vertically up to bringing the support edge 32 of the first arms 30 to a slightly lower level than the level of the support shelf P4 of the unloading station PS; at this stage the first arms are arranged substantially centred with respect to the carriage 20, and in any case are included within the horizontal longitudinal dimension of the corridor M;

successively, the first arms 30 are extracted from the carriage and penetrate, in the axial direction, into the unloading station PS, into an underlying position at a short distance below the ends of the objects R positioned resting on the support shelf P4 (as illustrated by broken lines in FIG. 8 and with position F1 in FIG. 7);

successively, the level of the upper support edges 32 is raised above the level of the support shelf P4, so that the support of the objects R is transferred from the support shelf P4 to the support arms 30 (as shown in a continuous line in FIG. 8);

successively, the support arms 30 are retracted out of the unloading station PS and with them the objects which rest on the upper support edges 32, and are brought inside the carriage 20, so that the arms 30 are retracted within the vertical corridor M, in order that the carriage 20 can be moved vertically between a shelf P4 and another of the loading/unloading stations (position F2 in FIG. 7).

In the loading step:

first the mobile carriage is moved vertically up to bringing the support edges 32 of the first arms 30 to a level slightly above the level of the support shelf P4 of the loading station PC; during this step the first arms are also arranged substantially centred with respect to the carriage 20, and in any case are comprised within the horizontal dimension of the longitudinal corridor M;

successively, the first arms 30 are extracted from the carriage, so that they penetrate, together with the objects they are bearing, into the loading station PC in a position overlying and at a short distance from the support shelf P4 (i.e. the brackets P3 thereof) (position F3 in FIG. 7);

successively, the level of the support edges 32 is lowered below the support shelf P4, so that the support of the objects R is transferred from the support arms 30 to the support shelf P4;

successively, the support arms 30 are retracted out of the unloading station PS leaving the objects resting on the support shelf P4, and brought internally of the carriage 20 (by the side of the group of objects R" previously deposited therein).

Normally, during the transfer steps of the objects from one station PS to another PC, it is also necessary to correct the axial position of the objects with respect to the first arms 30, between the unloading step and the loading step. This applies both in the case where it is desired to transfer groups of objects smaller in number than what is contained on the shelves P4 and in a case where complete shelves of objects are transferred one at a time.

In general, the objects are picked up from the unloading station PS, or stored in the loading station PC, using the end portion of the arms 30 arranged on the side where the station PS/PC itself is located; therefore if the loading and unloading stations are arranged on opposite sides, with respect to the intermediate corridor M, it is necessary to displace the objects on the arms 30 from one end portion thereof to the other of the arms.

To carry out this correction, after the objects R have been collected from the unloading station PS, and before they are re-deposited in the loading station PC, the following steps are performed:

the first arms 30 are made to slide axially, together with the objects R supported on them, so that these objects are brought to the second arms 40, in the most suitable position for the rationalization of the specific operating cycle;

successively, the second arms 40 are raised with respect to the first arms 30 and the objects R are supportingly received by the second support arms 40, thereby freeing the first arms 30;

successively, the first arms 30 are moved horizontally into the desired longitudinal arrangement with respect to the objects R supported on the second arms 40, successively, the second arms 40 are lowered compared to the first arms, releasing the objects to be supported on the first arms 30.

Figure 9A:
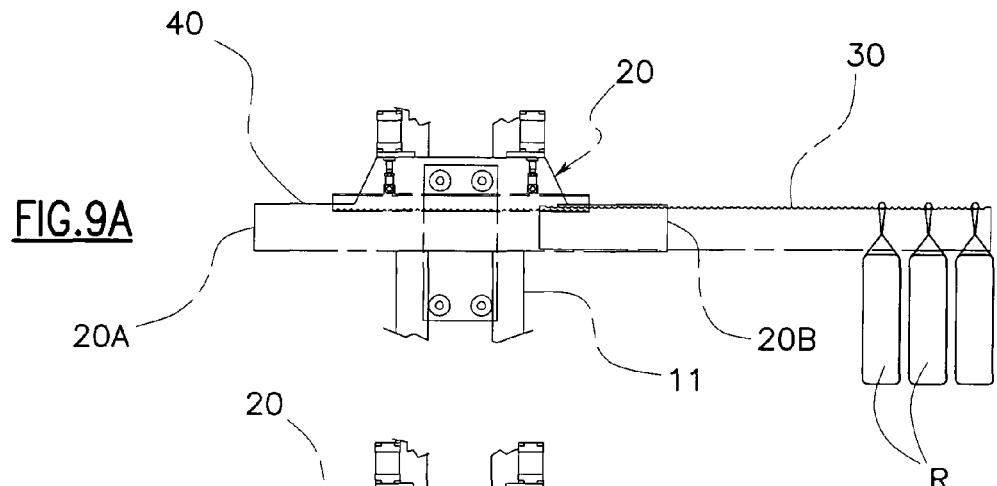
FIGS. 9A-9D schematically show the detail of FIG. 5 in successive handling stages implemented by the apparatus.
Figure 9B:
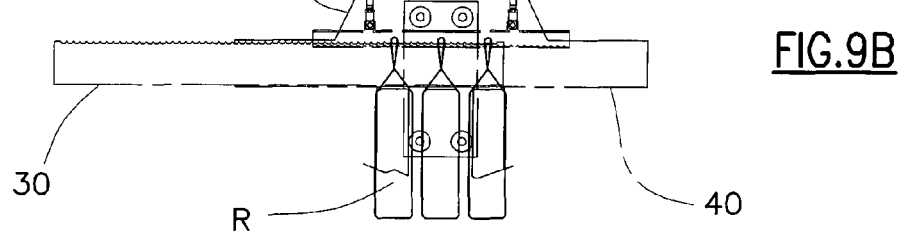
Figure 9C:
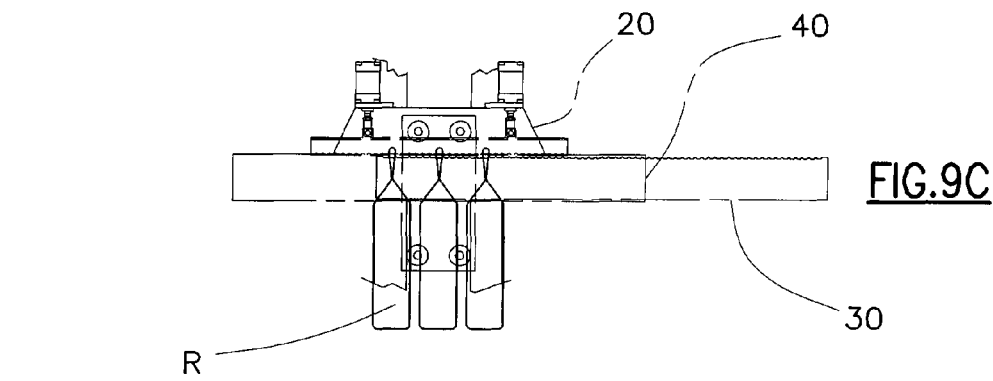
Figure 9D:
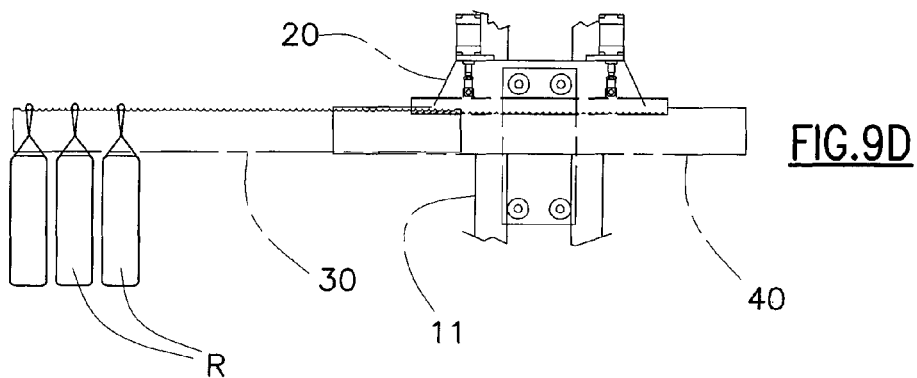

FIGS. 9A to 9D schematically illustrate an example of the correction procedure:

in FIG. 9A the first arms 30 have been loaded with a group of (three) objects R in arrival from an unloading station PS; the arms 30 project to a maximum extent from the right side 20b of the carriage and the objects R are positioned on the right end portion of the arms;

successively, in FIG. 9B, the first arms 30 have been retracted into the carriage 20 and have been partially extracted beyond the left side 20a, so as to bring the objects R to the second arms 40; subsequently, the second arms 40 are raised and the objects R are supportingly received by the second support arms 40, thereby freeing the first arms 30;

successively, in FIG. 9C, the first arms 30 are displaced to the right so that the objects R, which now rest on the second arms 40, are located at the left end portion of the arms;

finally, in FIG. 9D, the second arms 40 are lowered compared to the first arms 30 thereby releasing the objects R resting on the left end portion of the arms 30.

Therefore, the desired variation of the position of the objects on the first arms 30 is thus obtained; in the case illustrated in FIGS. 9A-9D, the displacement of objects from the right end portion to the left end portion of the arms 30 is obtained.

In the case illustrated above, there is a transfer of objects between two stations PS and PC each having a plurality of support shelves superposed on one another.

However, with the invention the stations PS and/or PC can have one only support shelf. A typical application of this type is for transferring objects which are stored provisionally in a station PS located at an outlet of an apparatus readying the objects (for example an apparatus arranging the sacked meats R2 hanging from bars R1), collecting them with the apparatus 10 and arranging them on shelving provided with various shelves P4.

Further, and again in reference to the above-illustrated case, the transfer of the objects is done between two stations PS and PC located at opposite sides with respect to the corridor M. However, according to the invention, the stations PS and PC can be placed at the same side with respect to the corridor M, for example flanked and parallel to one another; in this case, the whole handling apparatus 10 is translated parallel between the unloading position and the loading position and vice versa. For this purpose, the apparatus can be provided with means 61 and 62 located at the lower and upper ends of the main structure 11, which enable translation thereof, with the aim of displacing the apparatus and making it operable with loading and unloading stations located flanked to one another.

Figure 11:
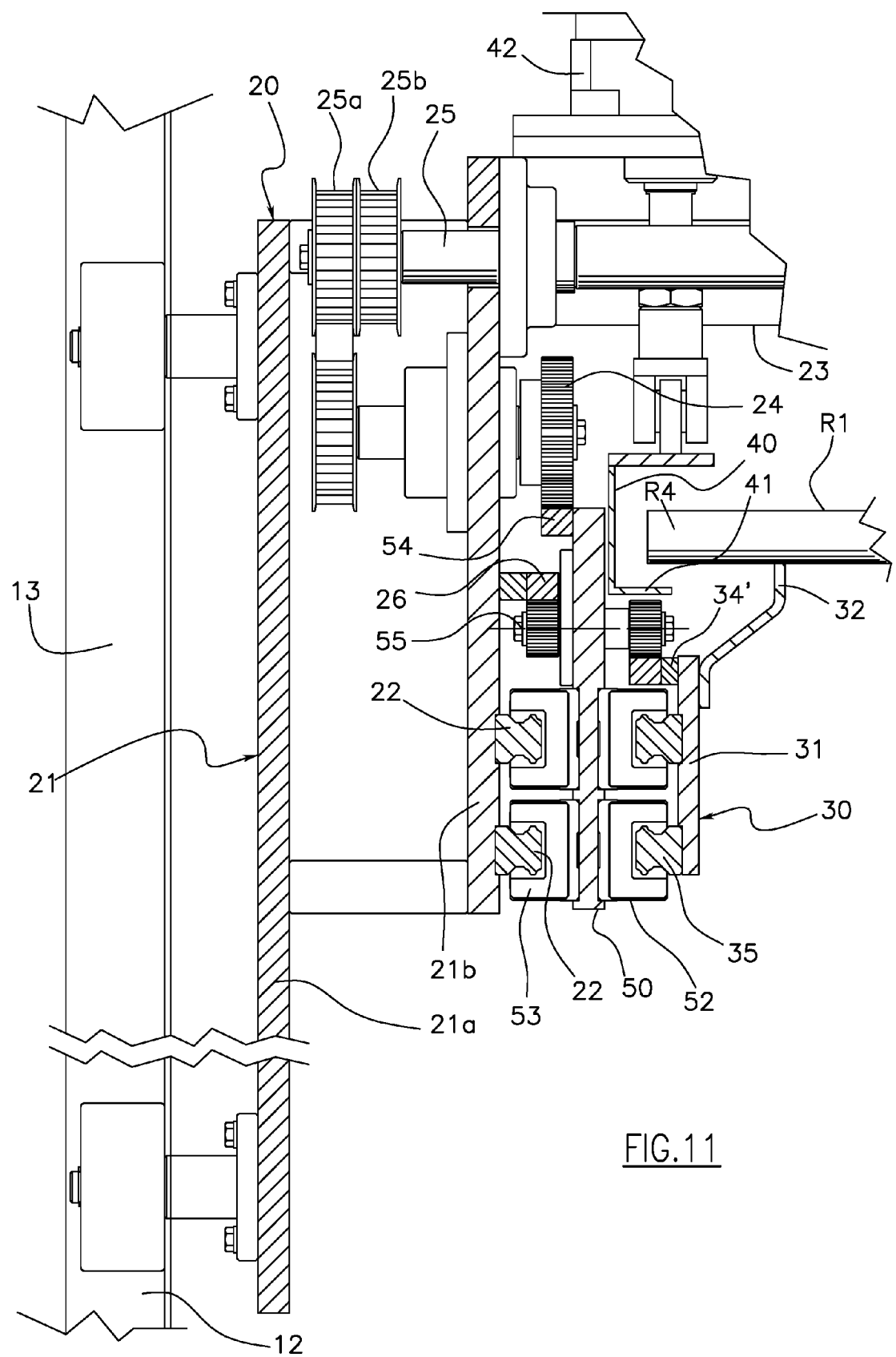
FIG. 11 is a section along plane XI-XI of FIG. 10.
Figure 11A:
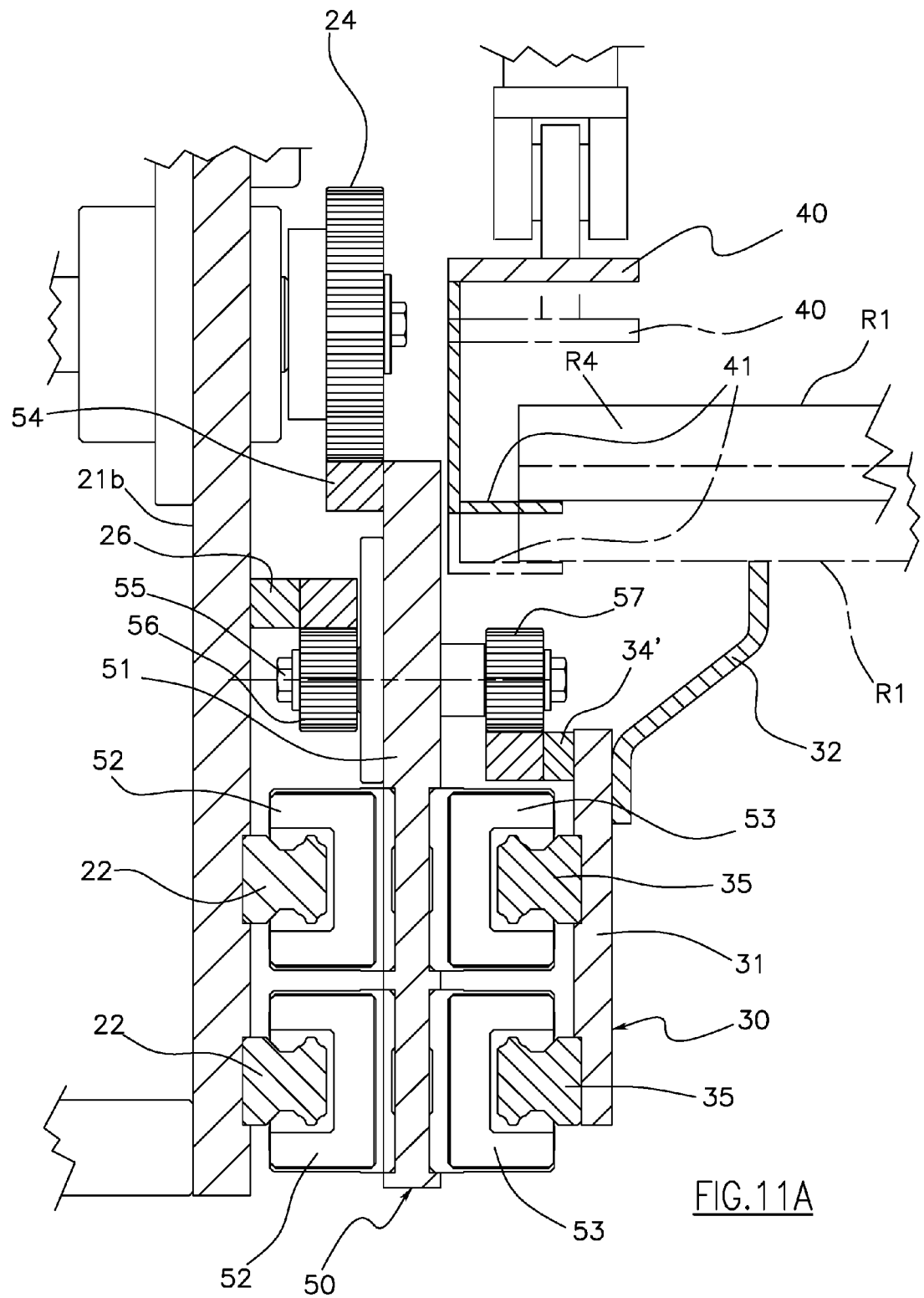
FIG. 11A is an enlarged detail of FIG. 11.

In the second embodiment, illustrated in FIGS. 10 and 11, the structure is partly modified in regard to the means for performing the extraction and retracting of the first arms 30. The solution adopted includes making the extracting of the first arms telescopic by use of a pair of second sides 50, elongate, straight, horizontal and parallel to one another, borne by the mobile carriage 20 in the vertical direction, each interposed between the respective first arm 30 and the respective side 21. The second sides 50 are associated to the respective first sides 21 slidingly with respect thereto in a longitudinal and horizontal direction along the axis thereof, with extraction and retraction with respect to the carriage, the support arms 30 being associated to the respective second sides 50 slidably with respect thereto in a longitudinal and horizontal direction along the axis thereof, with the ability to slide with respect thereto in a longitudinal and horizontal direction along the axis thereof, with extraction and retraction with respect to the carriage.

In the embodiment shown in FIGS. 10, 11, each second side 50 comprises a flat plate 51, having a rectangular plan, with a longitudinal horizontal dimension greater with respect to the height thereof and smaller with respect to the longitudinal dimension of the side 21 of the carriage 20. The external face of the plate 51 is constrained to the internal face of the internal plate 21b of the respective side 21, by means of guide elements 52 which engage with longitudinal and horizontal guides 22 located on the internal face of the plate 21B. By means of the guides 22 and the guide elements 52, each second side 50 is constrained to the respective side 21 with ability only to slide in the longitudinal and horizontal direction along the longitudinal axis thereof, with extraction and retraction with respect to the carriage 20.

At the same time, the internal face of the plate 51 is constrained to the internal face of the respective first arm 30 by means of longitudinal guide elements 53 which engage with longitudinal and horizontal guides 35 located on the internal face of the plate 31. By means of the guide elements 53 and the guides 35, each first arm 30 is constrained to the respective second side 50 with ability only to slide in the longitudinal and horizontal direction along the longitudinal axis thereof, with extraction and retraction thereof.

Each of the (four) gearwheels 24 engages on a rack 54, which runs substantially horizontal and longitudinal by a side of the entire upper edge of the plate 51.

A horizontal and transversal shaft 55 is idly pivoted to each second side 50 in a central axial position, to which shaft 55 a first gear wheel 56 is keyed, located close to the plate 21b, and a second gear wheel 57 located close to the first arm 30. The first wheel 56 engages in a horizontal and longitudinal rack 26 fixed to the internal lateral face of the internal plate 21b, which runs along the whole longitudinal extension thereof. The second wheel 57 engages in a horizontal and longitudinal rack 34' fixed to the first arm 30, which runs substantially along the whole arm 30.

During functioning, the same-direction rotation that is imparted by the shaft 25 to the wheels 24 produces, via the rack 54, a sliding of the second sides 50 in a longitudinal axial direction, in a direction or in an opposite direction; in turn, the sliding of each second side 50 produces, through the contemporaneous engagement of the wheel 56 with the rack 26 and the wheel 57 with the rack 34', a sliding in a same direction of the relative first arm 30, at twice the velocity with respect to the second side 50, thus actuating the telescopic effect.

With the second embodiment, illustrated in FIGS. 10 and 11, the maximum extraction length of the first arms 30 is increased, while the longitudinal dimension is kept within relatively low limits, especially for containing the general dimensions of the handling apparatus.

The invention claimed is:

1. A handling apparatus, for transferring one or more objects at a time between two loading/unloading stations each having at least a support shelf defined by two opposite projecting support brackets, which bears a plurality of objects together, each object having two opposite ends by which the objects rest on the support shelf, the handling apparatus comprising:
a main support structure having a vertical development,
a motorised mobile carriage, constrained to the main support structure with freedom to vertically translate,
a lifter able to produce a translation of the mobile carriage in a vertical direction,
a pair of first support arms, elongate, straight, constrained to the mobile carriage in such a way as to be arranged horizontal and parallel to one another, which are moved by the mobile carriage in the vertical direction, the first support arms having upper support edges able to restingly support the two opposite ends of the objects,
the first support arms being constrained to the mobile carriage telescopically, with a capability of extraction and retraction motion with respect to the mobile carriage along their longitudinal and horizontal axis, wherein the first support arms are reciprocally parallel and solid in motion;
an actuator for producing outward extraction of the first support arms with respect to the mobile carriage such as to produce penetration thereof internally of the loading/unloading stations, and respectively retraction of the first support arms internally of the carriage, in a longitudinal direction parallel to the support shelves,
the mobile carriage further bearing a pair of second support arms, elongate, straight, horizontal and having support edges able to restingly support the two opposite ends of the objects,
the second support arms being vertically mobile with respect to the first support arms to transfer the objects from a first resting position, wherein the objects rest on the first support arms and the support edges of the second support arms are located at a level lower than a level of the upper support edges of the first support arms, to a second resting position, wherein the objects rest on the second support arms and the support edges of the second support arms are located at a level higher than a level of the upper support edges of the first support arms, and vice versa, and
the first support arms being horizontally mobile with respect to the second support arms, when the objects are in the second resting position, in order to modify an axial position of the first resting position of the products along the longitudinal and horizontal axis of the first support arms.

2. The apparatus of claim 1, wherein the second support arms are arranged parallel to one another and in a spatial relation with the first support arms and are vertically mobile with respect thereto, a vertical displacement of the second support arms with respect to the first support arms realizing the transfer of the support on the objects from the first support arms to the second arms and vice versa.

3. The apparatus of claim 2, further comprising a further actuator, borne by the mobile carriage, which support and move the second support arms vertically in translation between a lowered position in which the support edges are located at a slightly lower level than a level of the upper support edges of the first support arms, and a raised position in which the support edges are positioned at a slightly higher level than the level of the upper support edges of the first support arms.

4. The apparatus of claim 1, wherein the mobile carriage has two opposite transversal sides and the first support arms are deinsertable and retractable with respect to both the opposite transversal sides of the mobile carriage.

5. The apparatus of claim 1, wherein the mobile carriage comprises two opposite longitudinal sides distanced from one another, having longitudinal sliders with which the support arms are associated to the respective sides with ability to slide with respect thereto in a longitudinal and horizontal direction along the longitudinal and horizontal axis thereof, with an extraction and retraction with respect to the mobile carriage.

6. The apparatus of claim 1, wherein the mobile carriage comprises two second longitudinal sides that are opposite and at a reciprocal distance from one another, positioned at internal faces of the first longitudinal sides, associated to the respective first longitudinal sides with a freedom to slide with respect thereto in a longitudinal and horizontal direction along an axis thereof, with an extraction and retraction with respect to the mobile carriage, the first support arms being associated to respective second longitudinal sides with a possibility to slide with respect thereto in a longitudinal and horizontal direction along the axis thereof, with extraction and retraction with respect to the mobile carriage.

7. The apparatus of claim 1, wherein the first support arms are arranged in a geometric relation with the loading and unloading stations, such that when they are penetrated into the stations, the first support arms are free to move along two end of the objects, below and relatively close to the brackets, and the upper support edges project towards a median line of the mobile carriage substantially beyond a free end of the brackets.

8. A method for transferring objects between two loading/unloading stations, wherein each of the loading/unloading stations has at least a support shelf defined by two opposite projecting support brackets, the objects having two opposite ends by means of which the objects rest on the support shelves, comprising:
   a) providing the handling apparatus of claim 1, and arranging the handling apparatus in an interposed position between a loading station and an unloading station,
in of an unloading station:
   b1) vertically moving the mobile carriage up to bringing upper support edges of first support arms of the handling apparatus to a slightly lower level than a level of the support shelf of the unloading station,
   b2) extracting the first support arms from a mobile carriage of the handling apparatus, causing penetration thereof into the unloading station,
   b3) raising a level of the upper support edges of the first support arms above the level of the support shelf, such that the objects are transferred from being supported by the support shelf to be supported by the first support arms, and
   b4) retracting the first support arms and the objects borne thereby out of the unloading station,
   c) varying the position in a longitudinal horizontal direction of the objects on the first support arms, wherein the step of varying comprises:
   c1) with the objects borne by the first support arms, raising the second support arms from a lowered position thereof, wherein support edges of the second support arms are located at a level lower than a level of the upper support edges of the first support arms, to a raised position thereof, wherein the support edges are positioned at a level higher than the level of the upper support edges of the first support arms, so that the objects are loaded on the second support arms freeing the first support arms,
   c2) with the objects borne by the second support arms, horizontally displacing the first support arms into a desired longitudinal position with respect to the objects borne by the second arms,
   c3) lowering the second support arms from the raised position thereof to the lowered position thereof to release the objects resting on a desired axial position of the first support arms;
in a loading step d) of a loading station:
   d1) vertically moving the carriage up to bringing the upper support edges of the first support arms of the handling apparatus to a slightly higher level than the level of the support shelf of the loading station,
   d2) extracting the first support arms from the mobile carriage, producing penetration thereof and of the objects borne thereby into the loading station,
   d3) lowering the level of the upper support edges below the level of the support shelf of the loading station, such that the objects are transferred from being supported by the first support arms to be supported by the support shelf of the loading station,
   d4) retracting the first support arms out of the loading station, wherein during the loading step d), the first support arms being extracted from a first side of the mobile carriage and during the unloading step a) the first support arms being extracted from a second side of the mobile carriage opposite to the first side.

* * * * *